US012269619B2

(12) United States Patent
Ishimoto

(10) Patent No.: US 12,269,619 B2
(45) Date of Patent: Apr. 8, 2025

(54) ROCKET CONTROL SYSTEM AND METHOD OF CONTROLLING LANDING OPERATION OF ROCKET

(71) Applicant: JAPAN AEROSPACE EXPLORATION AGENCY, Tokyo (JP)

(72) Inventor: Shinji Ishimoto, Tokyo (JP)

(73) Assignee: JAPAN AEROSPACE EXPLORATION AGENCY, Tokyo (JP)

( * ) Notice: Subject to any disclaimer, the term of this patent is extended or adjusted under 35 U.S.C. 154(b) by 206 days.

(21) Appl. No.: 18/002,589

(22) PCT Filed: Jul. 16, 2021

(86) PCT No.: PCT/JP2021/026728
§ 371 (c)(1),
(2) Date: Dec. 20, 2022

(87) PCT Pub. No.: WO2022/014694
PCT Pub. Date: Jan. 20, 2022

(65) Prior Publication Data
US 2023/0242281 A1    Aug. 3, 2023

(30) Foreign Application Priority Data
Jul. 17, 2020   (JP) .................... 2020-122733

(51) Int. Cl.
B64G 1/24   (2006.01)
B64G 1/62   (2006.01)
(52) U.S. Cl.
CPC ............ B64G 1/244 (2019.05); B64G 1/62 (2013.01)
(58) Field of Classification Search
None
See application file for complete search history.

(56) References Cited

U.S. PATENT DOCUMENTS 5,590,850 A * 1/1997 Cannon ............... F42B 10/663
                                                   244/3.21
5,631,830 A * 5/1997 Schroeder ............ F41G 7/22
                                                   701/4
(Continued)

FOREIGN PATENT DOCUMENTS

JP   2006250388 A   9/2006
JP   2016044667 A   4/2016
(Continued)

OTHER PUBLICATIONS

Strub; Pitch-Axis Identification for a Guided Projectile Using a Wind-Tunnel-Based Experimental Setup; Jun. 2016; IEEE/ASME Transactions on Mechatronics; vol. 21, No. 3; https://ieeexplore.ieee.org/abstract/document/7398106 (Year: 2016).*
(Continued)

Primary Examiner — David P. Merlino
(74) Attorney, Agent, or Firm — LUCAS & MERCANTI, LLP

(57) ABSTRACT

Provided is a method of controlling horizontal translational motion of a rocket without changing the attitude of the body and without increasing manufacturing costs and operation costs. This allows for accurate execution of rocket landing operation. A rocket control system includes a gimbal actuator that controls a steering angle of a gimbal mechanism located on a lower side of the body of the rocket with respect to the center of gravity; a fin actuator that controls a steering angle of an attitude control fin located on an upper side of the body of the rocket with respect to the center of gravity; a measurement unit that measures a physical quantity related to motion of the body of the rocket; and a control unit that controls the gimbal mechanism and the attitude control fin according to a result of measurement by the measurement unit to control horizontal translational motion of the rocket.

12 Claims, 9 Drawing Sheets

(56) References Cited

U.S. PATENT DOCUMENTS

| | | | |
|---|---|---|---|
| 8,939,084 B2* | 1/2015 | Cesaroni | F42B 15/22 |
| | | | 114/23 |
| 10,914,559 B1* | 2/2021 | Patel | F42B 10/668 |
| 2010/0314497 A1 | 12/2010 | Boelitz | |
| 2014/0231577 A1 | 8/2014 | Roy | |
| 2017/0267379 A1 | 9/2017 | Kobayakawa et al. | |
| 2017/0297748 A1* | 10/2017 | Zondervan | F02K 9/80 |
| 2017/0349301 A1 | 12/2017 | Bezos et al. | |
| 2019/0161214 A1 | 5/2019 | Kobayakawa et al. | |

FOREIGN PATENT DOCUMENTS

| | | | |
|---|---|---|---|
| JP | 2016068579 A | 5/2016 | |
| JP | 2018039390 A | 3/2018 | |
| JP | 2019520255 A | 7/2019 | |

OTHER PUBLICATIONS

Liu, "Fuel-Optimal Rocket Landing with Aerodynamic Controls", Journal of Guidance, Control, and Dynamics, 2019, vol. 42, No. 1, pp. 65-77.
International Search Report for Corresponding International Application No. PCT/JP2021/026728, 2 pages, Sep. 21, 2021.
Supplementary European Search Report for Corresponding European Patent Appl No. 21843229.2, issued Jun. 20, 2024, 7 pages.

* cited by examiner

ROCKET CONTROL SYSTEM AND METHOD OF CONTROLLING LANDING OPERATION OF ROCKET

CROSS-REFERENCE TO RELATED APPLICATIONS

This application is a 371 of PCT/JP2021/026728, filed Jul. 16, 2021, which claims the benefit of Japanese Patent Application No. 2020-122733, filed Jul. 17, 2020.

TECHNICAL FIELD

The present invention relates to a rocket control system and a method of controlling landing operation of a rocket.

BACKGROUND ART

A rocket control system for controlling a rocket's path, particularly, a rocket's path to landing, is known (see, for example, Non Patent Literature 1 and Patent Literature 1). For rocket landing operation, the rocket control system lands a rocket on a target point by controlling horizontal and vertical forces.

In a control system similar to a conventional rocket that does not perform landing (for example, Non Patent Literature 1), horizontal path control is performed by changing the attitude of a body. As shown in FIG. 8, when the attitude of the rocket body changes and the rocket body axis is inclined with respect to the velocity vector V to have a predetermined angle of attack (or air attitude) a during rocket landing operation, the aerodynamic force proportional to this angle of attack a acts on the rocket body. This aerodynamic force includes a component perpendicular to the velocity vector V of the rocket, which is called "lift." The lift L increases according to an increase in the angle of attack a. During the landing operation, the lift L is generated approximately in the horizontal direction.

Meanwhile, thrust T acts on the rocket body by a jet produced by an engine. When the rocket body is inclined to have a predetermined attitude angle $\theta$ with respect to the direction of gravity, a horizontal component Th of the thrust T increases according to an increase in the attitude angle $\theta$.

While the rocket is at a high altitude and has a high velocity, the lift L is dominant compared to the horizontal component Th of the thrust T, causing the rocket body to move rightward of the sheet of FIG. 8. In contrast, when the rocket approaches the ground and reduces its velocity, the horizontal component Th of the thrust T is dominant compared to the lift L, causing the rocket body to move leftward of the sheet of FIG. 8.

In the middle of descent of the rocket, the lift L and the horizontal component Th of the thrust T may come into balance, and this may cause a period (i.e., inactive period) in which the rocket can move neither left nor right by an attitude change. Such a phenomenon is a problem specific to the landing operation caused by the fact that the direction of the thrust T of the engine and the direction of the velocity vector V are opposite to each other during landing.

Patent Literature 2 describes a thruster control system having additional thrusters added thereto to solve this problem. Unfortunately, the addition of new thrusters may cause another problem, such as increased body weight, and increased manufacturing costs and operation costs. As such, the conventional techniques have difficulty in avoiding the period in which control by the attitude change is inactive and in continuously controlling horizontal translational motion of the rocket, while achieving lower cost.

CITATION LIST

Patent Literature

Patent Literature 1: JP 2018-39390 A
Patent Literature 2: JP 2019-520255 A

Non Patent Literature

Non Patent Literature 1: Liu, X., "Fuel-Optimal Rocket Landing with Aerodynamic Controls," Journal of Guidance, Control, and Dynamics, Vol. 42, No. 1, January 2019, PP. 65-77

SUMMARY OF INVENTION

Technical Problem

It is an object of the present invention to provide a rocket control system and a method of controlling landing operation of a rocket that are capable of avoiding a period in which control by the attitude change is inactive and continuously controlling horizontal translational motion of the rocket, thereby allowing for accurate execution of the rocket landing operation, without increasing manufacturing costs and operation costs.

Solution to Problem

To solve the foregoing problem, a rocket control system according to the present invention includes a gimbal actuator that controls a steering angle of a gimbal mechanism located on a lower side of a body of the rocket with respect to the center of gravity; a fin actuator that controls a steering angle of an attitude control fin located on an upper side of the body of the rocket with respect to the center of gravity; a measurement unit that measures a physical quantity related to motion of the body of the rocket; and a control unit that controls the gimbal mechanism and the attitude control fin according to a result of measurement by the measurement unit to control horizontal translational motion of the rocket.

In addition, a method of controlling landing operation of a rocket according to the present invention is a method of controlling a rocket including: a gimbal mechanism located on a lower side of a body of the rocket with respect to the center of gravity, a steering angle of which can be changed; and an attitude control fin located on an upper side of the body of the rocket with respect to the center of gravity, a steering angle of which can be changed. The method includes measuring a physical quantity related to motion of the body of the rocket; and controlling the gimbal mechanism and the attitude control fin according to a result of measurement of the physical quantity to control horizontal translational motion of the rocket.

Advantageous Effects of Invention

According to the present invention, it is possible to provide a rocket control system and a method of controlling landing operation of a rocket that are capable of continuously controlling horizontal translational motion of the rocket, thereby allowing for accurate execution of the rocket landing operation, without increasing manufacturing costs and operation costs.

DESCRIPTION OF EMBODIMENTS

In the following, the present embodiments will be described with reference to the attached drawings. In the attached drawings, functionally identical elements may be designated with identical numerals. The attached drawings illustrate embodiments and an implementation example in accordance with the principles of the present disclosure. However, these are provided to assist an understanding of the present disclosure and should not be construed as limiting the present disclosure. It should be understood that the descriptions that follow are for exemplary purposes only, and do not in any way represent a limitation of the scope of the claims or application examples of the present disclosure.

While the present embodiments are described in sufficient detail to enable a person skilled in the art to practice the present disclosure, it will be understood that other implementations or embodiments are also possible, and that various changes to configurations or structures and various substitutions of elements may be made without departing from the scope and spirit of the technical concepts of the present disclosure. Accordingly, the following descriptions are not to be interpreted in a limiting sense.

First Embodiment

Figure 1:
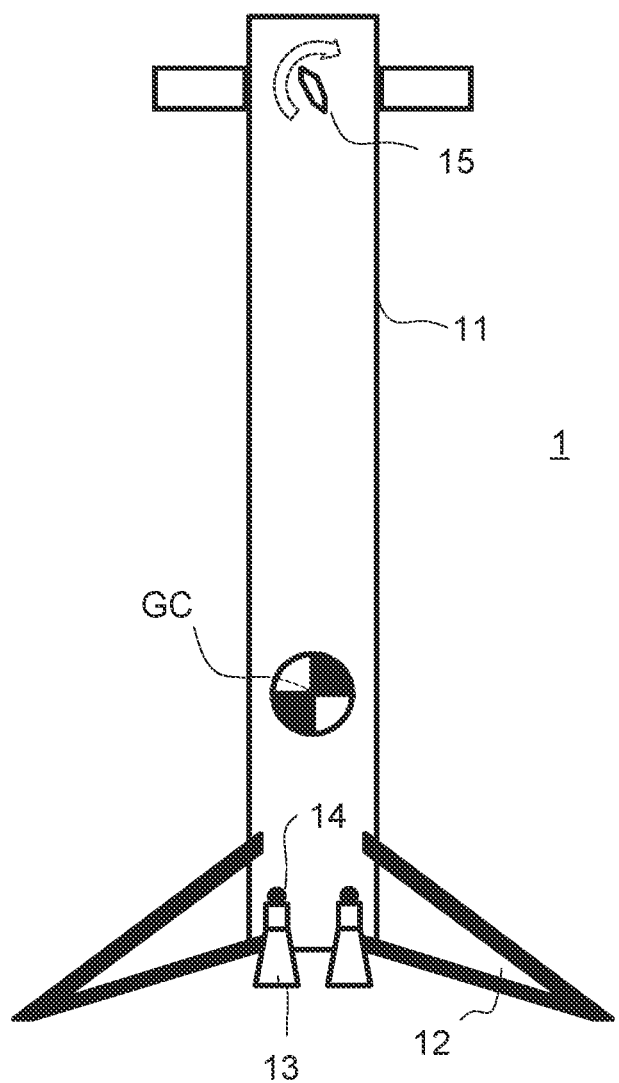
FIG. 1 is a schematic diagram of a rocket 1 that is a controlled object in a rocket control system of a first embodiment.
Figure 2:
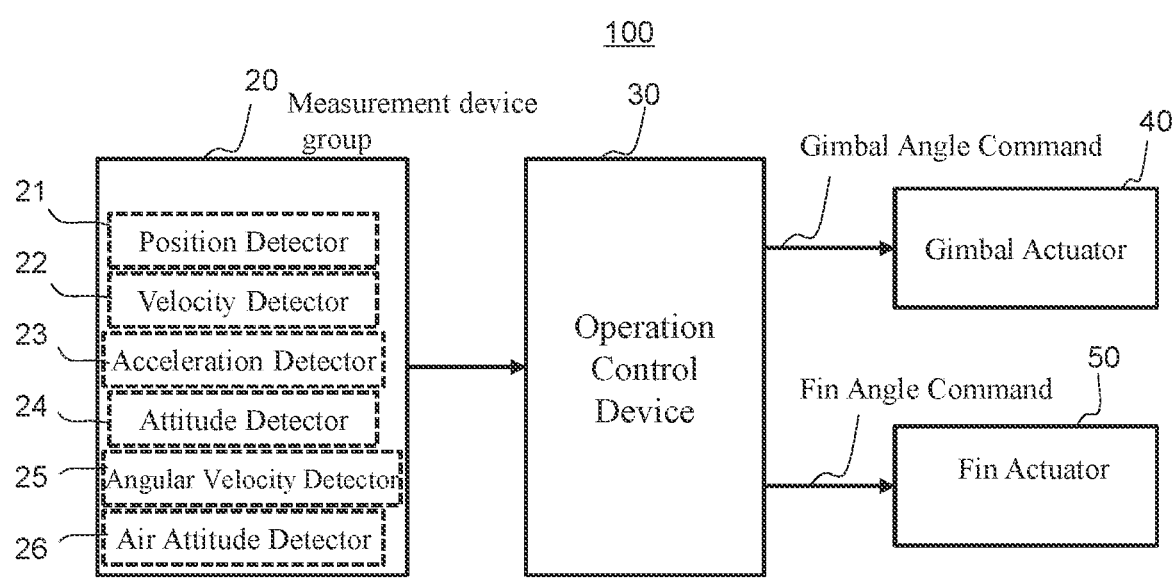
FIG. 2 is a block diagram illustrating the configuration of a rocket control system 100 of the first embodiment.

Referring to FIG. 1 and FIG. 2, a rocket control system according to a first embodiment will be described. FIG. 1 is a schematic diagram of a rocket 1 that is a controlled object in the rocket control system of the first embodiment. In one example, the rocket 1 includes a body 11, a landing gear 12, an engine 13, a gimbal mechanism 14, and an attitude control fin (aerodynamic control surface) 15. The rocket control system is mounted inside of the body 11 of the rocket 1.

In the rocket 1, the attitude control fin 15 is located on the upper side (on the leading end (nose) side) with respect to the center of gravity GC and the engine 13 is located on the lower side (on the trailing end (tail) side) with respect to the center of gravity GC.

The engine 13 produces a jet with a propellant, thereby providing propulsion to the body 11. The attitude (orientation) of the engine 13 is controlled by the gimbal mechanism 14. The gimbal mechanism 14 is driven by a gimbal actuator, which will be described later. Change in the angle of the gimbal mechanism 14 (gimbal angle) changes the direction of the thrust T of the engine 13. Meanwhile, the attitude control fin 15 is rotationally driven by a fin actuator, which will be described later. Change in the angle of the attitude control fin 15 (fin angle) changes the magnitude of the lift L. The lift L is the resultant of the force produced by the body 11 according to the angle of attack a and the force produced by the attitude control fin 15 according to the angle of attack a and the steering angle.

By individually controlling the engine 13 and the attitude control fin 15, which are respectively provided below and above the center of gravity GC as described above, horizontal translational motion of the rocket 1 can be achieved during the landing operation of the rocket 1 without changing the attitude and without disabling horizontal movement because of the lift L and the horizontal component Th of the thrust T coming into balance in the middle of the landing operation.

Figure 9:
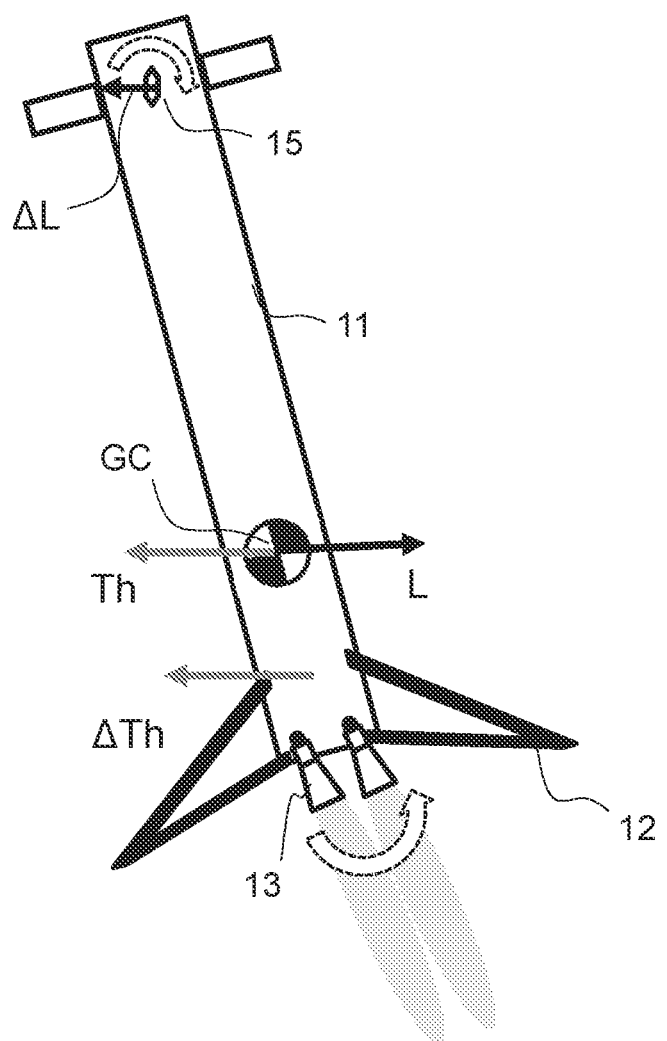
FIG. 9 is a schematic diagram illustrating a method of generating a controlling force without changing the attitude.

In the conventional control system, the gimbal angle and the fin angle are used only to control moments around the center of gravity GC. In the control system of the present embodiment, the gimbal angle and the fin angle are used also to produce horizontal forces. That is, the system of the present embodiment simultaneously controls the steering angle of the gimbal mechanism 14 and the steering angle of the attitude control fin 15 from the state where the moments around the center of gravity GC are balanced, and produces ΔTh and ΔL, which are the forces of magnitudes inversely proportional to their respective distances from the center of gravity GC, in the same direction along the horizontal direction, as shown in FIG. 9.

Figure 8:
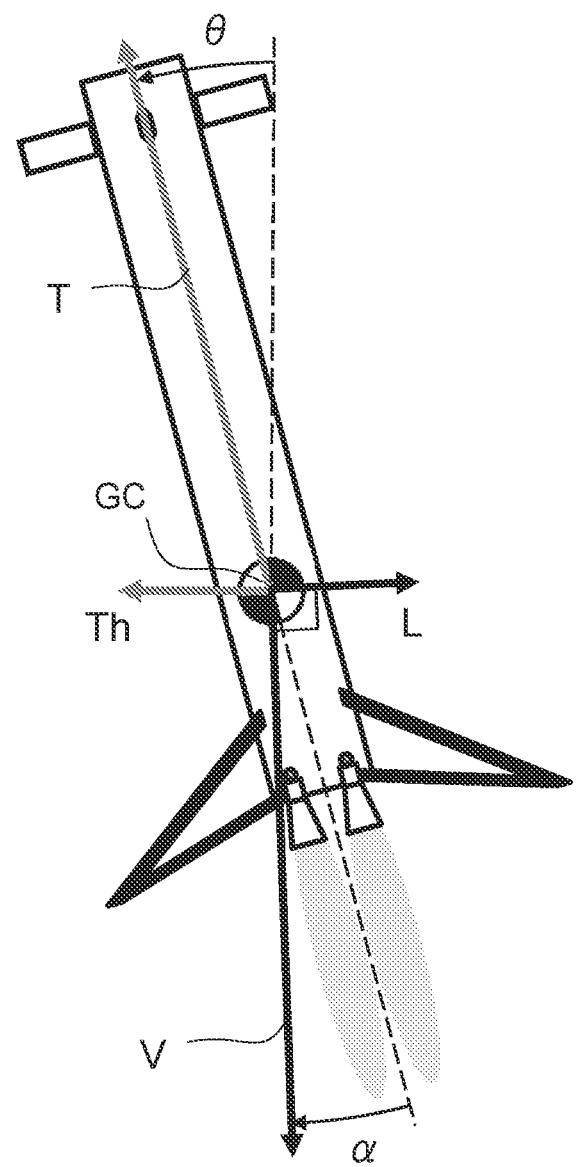
FIG. 8 is a schematic diagram illustrating the problem of conventional techniques.

According to the operation of the present embodiment, since the moment generated by ΔTh around the center of gravity GC and the moment generated by ΔL around the center of gravity GC cancel each other, it is possible to directly produce the resultant force ΔTh+ΔL in the horizontal direction while maintaining the balance of the moments around the center of gravity GC. Using such a resultant force allows controlling the horizontal translational motion of the rocket 1. While a controlling force can be changed indirectly by the attitude change, the resultant force ΔTh+ΔL, which will be hereinafter called a "direct force," does not involve the attitude change. FIG. 9 shows that, even from the state where the lift L and the horizontal component Th of the thrust T are balanced as shown in FIG. 8, the foregoing method using the direct force ΔTh+ΔL allows horizontal movement in the left direction of the sheet. It should be understood that in the embodiment described below, landing operation includes not only landing on the Earth but also landing on a celestial body with an atmosphere.

FIG. 2 is a block diagram illustrating the configuration of the rocket control system 100. This rocket control system 100 substantially includes a measurement device group 20, an operation control device 30, a gimbal actuator 40, and a fin actuator 50.

The measurement device group 20 is a set of devices for detecting physical quantities (e.g., position, velocity, acceleration, attitude, angular velocity, and air attitude) related to the motion of the body 11 of the rocket 1. In one example, the measurement device group 20 includes a position detector 21 (GPS receiver, for example), a velocity detector 22 (velocity sensor, for example), an acceleration detector 23

(acceleration sensor, for example), an attitude detector 24 (gyro sensor, for example), an angular velocity detector 25 (angular velocity sensor, for example), an air attitude detector 26, and the like. The detectors 21 to 26 may be composed of sensors appropriately disposed in the body 11. The device group of FIG. 2 is an example. A detector other than the illustrated detectors may be added to the device group, or a part of the illustrated detectors may be omitted. The arrangement and the number of the same type of sensors, the performance of sensors, and the like should not be limited to those specified.

The operation control device 30 is composed of a typical computer, and includes a central processing unit, various types of memory, an input/output interface, and computer programs, for example. The operation control device 30 generates steering-angle commands for the gimbal actuator 40 and the fin actuator 50 based on the physical quantities calculated by the measurement device group 20. The gimbal actuator 40 and the fin actuator 50 generate drive signals according to the received steering-angle commands to control the steering angle of the gimbal mechanism 14 and the steering angle of the attitude control fin 15.

Figure 3:
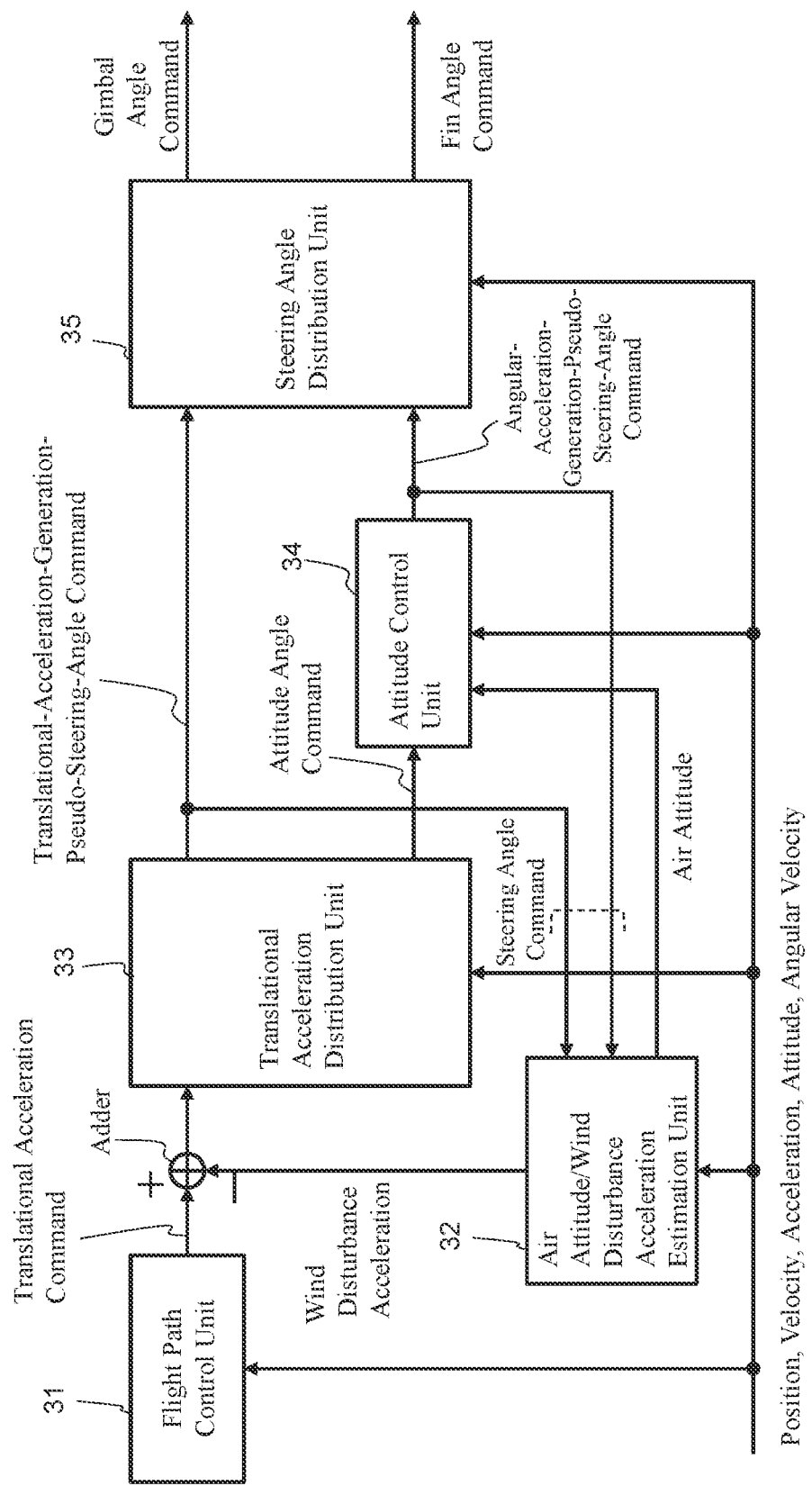
FIG. 3 is a control block diagram illustrating details of the operation processing executed by an operation control device 30.

Next, referring to the control block diagram of FIG. 3, details of the operation processing executed by the operation control device 30 will be described. The operation control device 30 implements in the computer a flight path control unit 31, an air attitude/wind disturbance acceleration estimation unit 32, a translational acceleration distribution unit 33, an attitude control unit 34, and a steering angle distribution unit 35 according to the computer programs stored therein.

The flight path control unit 31, based on the various physical quantities (e.g., position, velocity, acceleration, attitude, and angular velocity of the rocket 1) obtained by the measurement device group 20, determines a path along which the body 11 of the rocket 1 should fly, calculates a translational acceleration for the horizontal translational movement of the body 11 of the rocket 1 relative to the ground surface, and outputs a translational acceleration command for instructing the translational acceleration. Here, the "translational acceleration command" is an instruction about the translational acceleration that should be given to the center of gravity of the body 11. In an adder, a wind disturbance acceleration estimated by the air attitude/wind disturbance acceleration estimation unit 32 is subtracted from the translational acceleration command, and the result of subtraction is transferred to the translational acceleration distribution unit 33. Such subtraction helps remove the influence of wind disturbance acceleration based on the wind around the rocket 1.

The air attitude/wind disturbance acceleration estimation unit 32, based on the data on the physical quantities (e.g., position, velocity, acceleration, attitude, and acceleration of the rocket 1) measured by the measurement device group 20, estimates an air attitude that is an attitude to the airflow (relative wind) of the body 11 of the rocket 1 and a wind disturbance acceleration caused by wind. In addition to the result of measurement by the measurement device group 20, the air attitude/wind disturbance acceleration estimation unit 32 estimates the air attitude of the rocket 1 and the wind disturbance acceleration also based on a translational-acceleration-generation-pseudo-steering-angle command fed back from the translational acceleration distribution unit 33 and an angular-acceleration-generation-pseudo-steering-angle command fed back from the attitude control unit 34 (these commands will collectively be referred to as the "steering-angle commands"). This is because the influence of the magnitudes of the steering angles of the gimbal mechanism 14 and the attitude control fin 15 needs to be removed from the result of measurement by the measurement device group 20 for estimation of the wind disturbance acceleration simply under the influence of wind.

The translational acceleration distribution unit 33 generates, according to the calculated translational acceleration command (after subtracting wind disturbance acceleration data), a translational-acceleration-generation-pseudo-steering-angle command and an attitude angle command, under the distribution rule determined based on the physical quantities measured by the measurement device group 20. The translational-acceleration-generation-pseudo-steering-angle command corresponds to the translational acceleration generated by the direct force of the gimbal mechanism 14 and the attitude control fin 15. The translational acceleration generated by the direct force of the gimbal mechanism 14 and the attitude control fin 15 and the translational acceleration generated by the attitude change can be predicted from the physical quantities measured by the measurement device group 20. Based on a relative effect of these two translational accelerations, the distribution rule serves to distribute the translational acceleration command to the translational-acceleration-generation-pseudo-steering-angle command and to the attitude angle command. Provided that $A_{\delta A}$ is a translational acceleration when a translational-acceleration-generation-pseudo-steering-angle command $\delta_A$ is changed by a unit angle, and $A_\gamma$ is a translational acceleration when an attitude angle command $\gamma$ is changed by a unit angle, the "effect" is expressed with these $A_{\delta A}$ and $A_\gamma$. A final translational acceleration A is given by $A=A_{\delta A}\delta_A+A_\gamma \gamma$. To match this A with a translational acceleration command $A_C$ (after subtracting the influence of wind), the following computation is performed. The aforementioned distribution rule is based on this computation.

$$\delta_A = \eta_{\delta A} A_{\delta A}/(\eta_{\delta A} A_{\delta A}^2 + \eta_\gamma A_\gamma^2) \times A_C$$

$$\gamma = \eta_\gamma A_\gamma/(\eta_{\delta A} A_{\delta A}^2 + \eta_\gamma A_\gamma^2) \times A_C \qquad \text{[Equation 1]}$$

Where, $\eta_{\delta A}$ and $\eta_\gamma$ are positive real numbers for adjusting the proportion of the distribution. $A_C$, $\delta_A$, $\gamma$ each indicate a deviation from their respective target states. This computation is an implementation example of the distribution rule. Other computation or utilizing a machine-trained input/output relationship not depending on computation may also be possible, for example.

In the period in which control by the attitude change is inactive (i.e., period in which the translational acceleration $A_\gamma$ generated by the attitude change is zero), the translational acceleration command is entirely distributed to the translational-acceleration-generation-pseudo-steering-angle command. Since the translational-acceleration-generation-pseudo-steering-angle command and the attitude angle command are appropriately generated under this distribution rule, it is possible to avoid the period in which control by the attitude change is inactive and to continuously control translational motion of the rocket 1.

Figure 4:
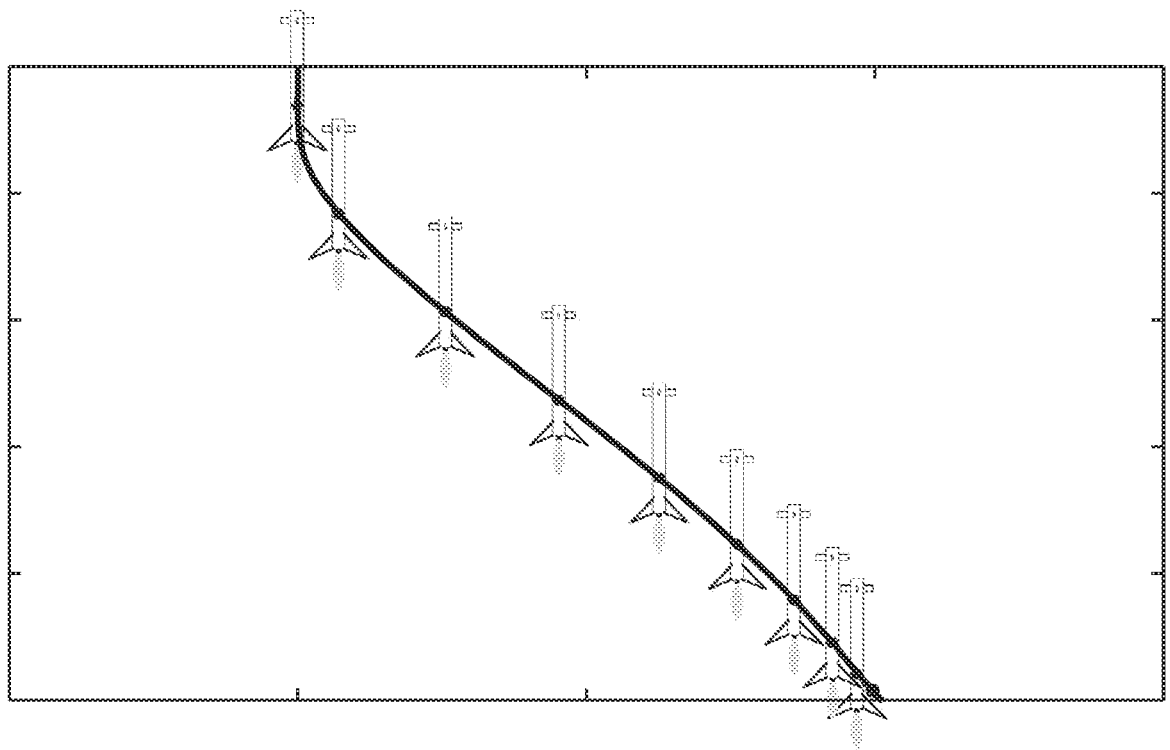
FIG. 4 illustrates an example of the state of controlling translational motion of the rocket 1 while generating a controlling force (in a horizontal direction) perpendicular to the velocity vector of the rocket 1.

The translational-acceleration-generation-pseudo-steering-angle command is for instructing the magnitude and sign of the resultant force $\Delta Th+\Delta L$ of $\Delta Th$ and $\Delta L$ shown in FIG. 9 in order to give the rocket 1 a part or all of the translational acceleration calculated by the flight path control unit 31, using the direct force produced by the gimbal mechanism 14 and the attitude control fin 15 without changing the attitude of the body 11. Meanwhile, the attitude angle command is a signal for providing an instruction about the attitude angle that should be applied to the body 11 of the rocket 1 in order to give the rocket 1 the remaining part of the translational acceleration calculated by the flight path control unit 31. The proportion of the distribution among the translational-acceleration-generation-pseudo-steering-angle command and the attitude angle command can be changed differently from the proportion under the aforementioned distribution rule. When the proportion of the translational-acceleration-generation-pseudo-steering-angle command is set to zero (i.e., $\eta_{\delta A}=0$), control of the translational motion is equivalent to that in the conventional control system for controlling the translational motion only by the attitude change of the body 11. Meanwhile, when the proportion of the attitude angle command is set to zero (i.e., $\eta_\gamma=0$), the horizontal translational motion is controllable without changing the attitude of the body 11. FIG. 4 illustrates the body attitude and path in such a case. FIG. 4 simply illustrates the motion that can be performed only by the present embodiment. In the period in which the translational motion can be effectively controlled by changing the attitude angle, it is reasonable to use both of the direct force produced by the gimbal mechanism and the attitude control fin and the change in the attitude angle under the aforementioned distribution rule.

The attitude control unit 34 generates, according to this attitude angle command, an angular-acceleration-generation-pseudo-steering-angle command by further taking into account the air attitude estimated by the air attitude/wind disturbance acceleration estimation unit 32 and the various physical quantities measured by the measurement device group 20 as well. The angular-acceleration-generation-pseudo-steering-angle command is for instructing the magnitude and sign of an angular acceleration (equivalent to a moment around the center of gravity) that should be given to the body 11 of the rocket 1 to reach the attitude angle instructed by the attitude angle command.

The steering angle distribution unit 35 outputs, according to the virtually-given translational-acceleration-generation-pseudo-steering-angle command and angular-acceleration-generation-pseudo-steering-angle command, a gimbal angle command and a fin angle command to be actually output to the gimbal mechanism 14 and the attitude control fin 15, respectively, by taking into account the physical quantities (e.g., position, velocity, acceleration, attitude, and acceleration) actually measured by the measurement device group 20 as well. The angular acceleration that can be produced by each of the gimbal mechanism 14 and the attitude control fin 15 can be predicted from the physical quantities measured by the measurement device group 20. Provided that $\delta_G$ is a gimbal angle command, $\delta_F$ is a fin angle command, and $M_{\delta G}$, $M_{\delta F}$ are angular accelerations generated by changing $\delta_G$ and $\delta_F$ by a unit steering angle, respectively, the translational-acceleration-generation-pseudo-steering-angle command $\delta_A$ and the angular-acceleration-generation-pseudo-steering-angle command $\delta_M$ are distributed to $\delta_G$ and $\delta_F$ by the following computation.

$$\delta_F = M_{\delta G}/(\eta_{\delta F} M_{\delta F}^2 + \eta_{\delta G} M_{\delta G}^2) \times \delta_A + \eta_{\delta F} M_{\delta F}/(\eta_{\delta F} M_{\delta F}^2 + \eta_{\delta G} M_{\delta G}^2) \times \delta_M$$

$$\delta_G = -M_{\delta F}/(\eta_{\delta F} M_{\delta F}^2 + \eta_{\delta G} M_{\delta G}^2) \times \delta_A + \eta_{\delta G} M_{\delta G}/(\eta_{\delta F} M_{\delta F}^2 + \eta_{\delta G} M_{\delta G}^2) \times \delta_M \quad \text{[Equation 2]}$$

Where, $\eta_{\delta F}$ and $\eta_{\delta G}$ are positive real numbers and used for adjusting the proportion of the distribution of $\delta_M$ to $\delta_F$ and to $\delta_G$. $\delta_F$, $\delta_G$, and the like each indicate a deviation from their respective target states. The angular acceleration M obtained by the operation of $\delta_F$ and $\delta_G$ is given by $M = M_{\delta F}\delta_F + M_{\delta G}\delta_G$. Substituting the above equation can obtain $M=\delta_M$, which does not include $\delta A$. That is, the translational-acceleration-generation-pseudo-steering-angle command $\delta_A$ is distributed to $\delta_F$ and $\delta_G$ so that an angular acceleration (equivalent to a moment) will not be generated around the center of gravity GC. The above computation is an implementation example of the steering angle distribution unit 35. Other computation or operation and processing other than computation may also be possible. Solving the above equation for $\delta_A$ and $\delta_M$ results as follows.

$$\delta_A = \eta_{\delta G} M_{\delta G} \delta_F - \eta_{\delta F} M_{\delta F} \delta_G$$

$$\delta_M = M_{\delta F}\delta_F + M_{\delta G}\delta_G \quad \text{[Equation 3]}$$

This equation expresses how the two pseudo-steering-angle commands $\delta_A$, $\delta_M$ are defined by the two physical steering angles $\delta_F$ and $\delta_G$. The computation and operation performed by the steering angle distribution unit 35 and the definitions of the two pseudo-steering-angle commands have a one-to-one correspondence.

As described above, according to the system 100 of the present embodiment, it is possible to produce the direct force by appropriately controlling the steering angles of the gimbal mechanism 14 of the engine 13 and the attitude control fin 15, which are respectively disposed below and above the center of gravity GC, to control the horizontal translational acceleration. Since the system 100 of the present embodiment can control the translational acceleration with the gimbal mechanism 14 and the attitude control fin 15 by controlling their steering angles, it is possible to accurately control the translational movement without having a special engine added for the translational movement. In addition, since the steering angle given to the gimbal mechanism 14 and the steering angle given to the attitude control fin 15 are properly distributed by the translational acceleration distribution unit 33 and the steering angle distribution unit 35 according to the physical quantities measured by the measurement device group 20, while maintaining the balance of the moments around the center of gravity GC, it is possible to produce thrust (in the horizontal direction) perpendicular to the velocity vector of the rocket 1 without changing the attitude of the rocket 1 to control the translational motion (see FIG. 4).

Figure 5:
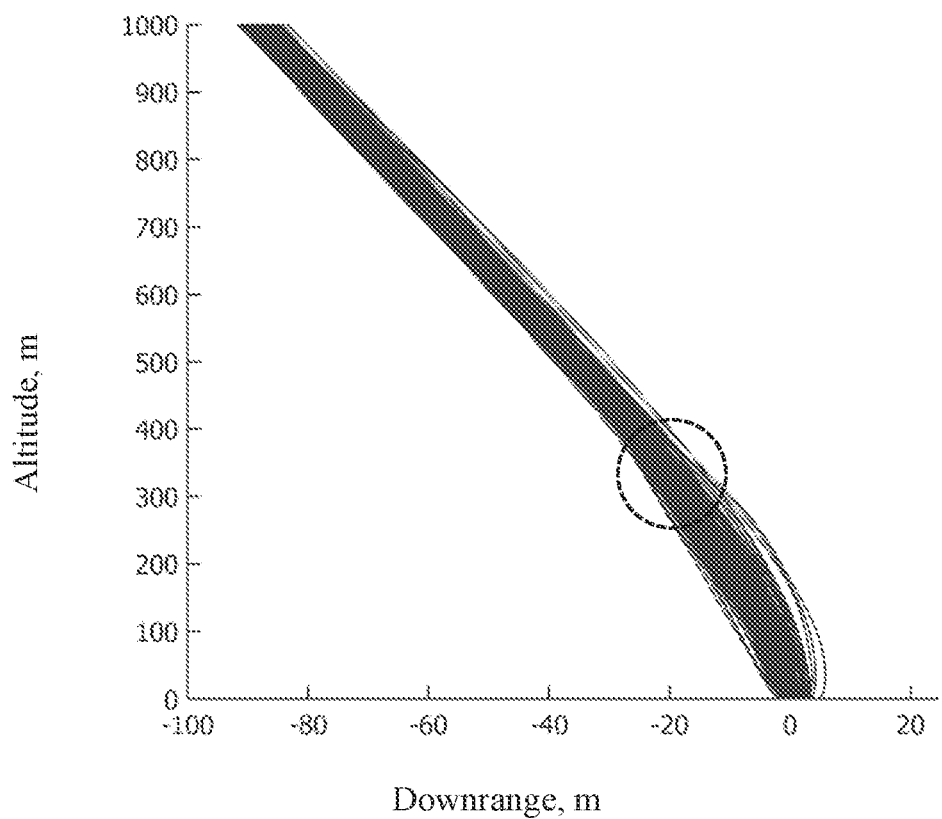
FIG. 5 is a graph showing a simulation result of a comparative example.
Figure 6:
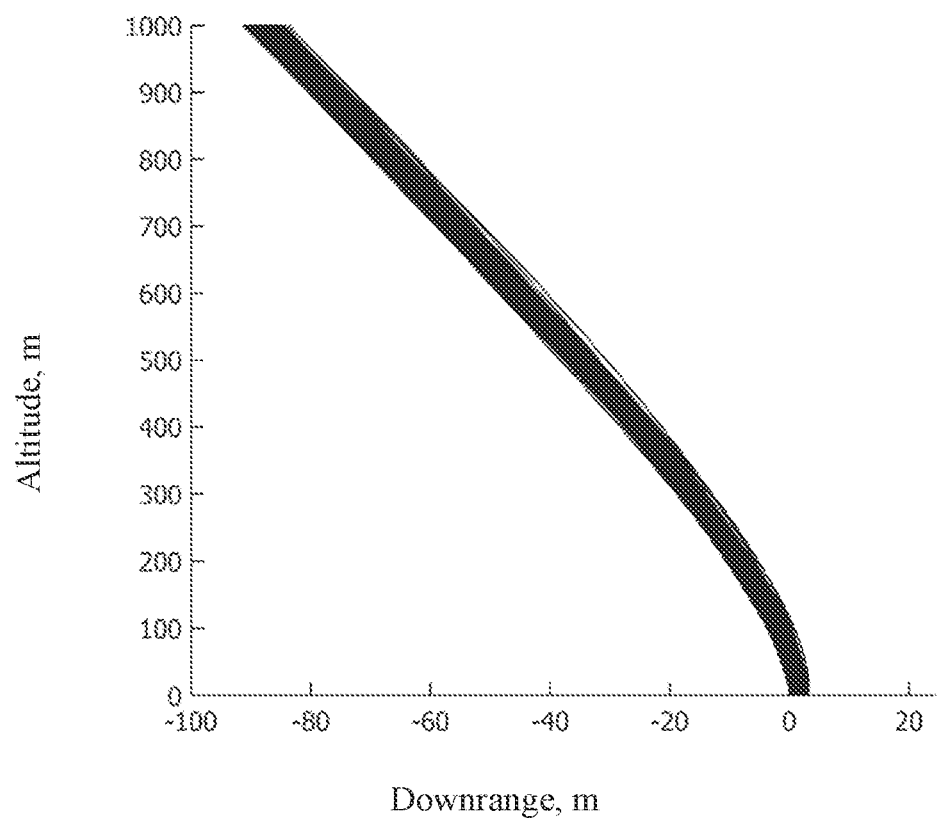
FIG. 6 is a graph showing a simulation result of the present embodiment.

According to the present embodiment, it is possible to move the rocket 1 in the horizontal direction by using both of the change in the lift L and the horizontal component Th of the thrust T by changing the attitude of the body of the rocket 1 and the direct force ΔTh+ΔL produced by the gimbal mechanism 14 and the attitude control fin 15 without changing the attitude of the body of the rocket 1. In contrast, when the horizontal movement of the rocket is controlled by controlling only the attitude of the rocket 1, it is difficult to avoid a period (i.e., inactive period) in which the rocket can move neither left nor right, which results from the state of balance between the lift L and the horizontal component Th of the thrust T as shown in FIG. 8. Since the persistent inactive period will disable the path control by the attitude change of the rocket as shown in the comparative example of FIG. 5, the body 11 of the rocket 1 will be affected by wind, causing variations in the path, leading to a large error of the landing point. In contrast, according to the present embodiment, it is possible to avoid or reduce the occurrence of such an inactive period, thus reducing the variations in the path and reducing the error of the landing point (see FIG. 6). In addition, unlike Patent Literature 2, the present embodiment does not require additional thrusters, and thus an increase in the manufacturing costs can be suppressed. It should be noted that FIG. 5 and FIG. 6 are graphs each showing a simulation result of the rocket's flight path and landing position assuming several hundreds of wind.

It should be noted that control by the attitude control fin 15 is effective only when the velocity of the rocket 1 is at or above a predetermined value. This means that the attitude control fin 15 is not effective in the period in which the rocket 1 is about to land on the ground surface at a low velocity, where only the gimbal mechanism 14 is used to control the rocket 1 to maintain its translational movement. Specifically, the angular-acceleration-generation-pseudo-steering-angle command is converted only to the steering angle of the gimbal mechanism 14, and the steering angle of the attitude control fin 15 is not controlled. Meanwhile, the translational-acceleration-generation-pseudo-steering-angle command is set to zero, and in this period, control of the translational motion is equivalent to that in the conventional control system for controlling the translational motion only by the attitude change of the body 11. Using the above-described computation equations allows proper distribution also in this period, without giving special consideration.

Second Embodiment

Figure 7:
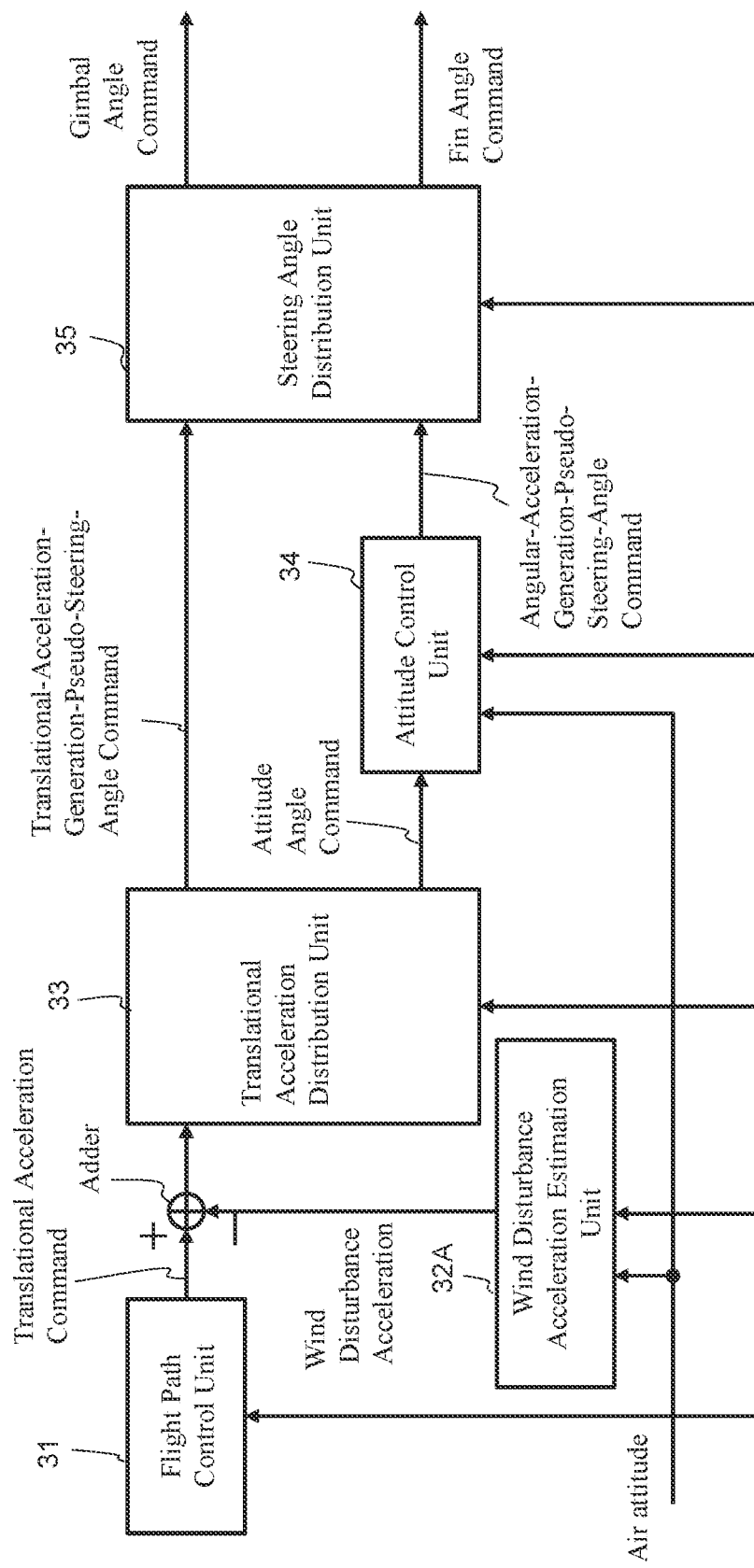
FIG. 7 is a control block diagram illustrating details of the operation processing executed by an operation control device 30 of a second embodiment.

Next, referring to FIG. 7, a rocket control system according to a second embodiment will be described. As in the first embodiment, the rocket control system of the second embodiment includes the engine 13 and the attitude control fin 15 respectively disposed below and above the center of gravity GC. The rocket control system controls the translational movement of the rocket during landing by controlling the steering angles of the engine 13 and the attitude control fin 15. Since the overall configuration of the system 100 is equal to that of the first embodiment (FIG. 2), repeated description will be omitted. The system of the second embodiment is different from the first embodiment in the operation processing by the operation control device 30.

Referring to the control block diagram of FIG. 7, details of the operation processing executed by the operation control device 30 will be described. The operation control device 30 of the second embodiment includes a wind disturbance acceleration estimation unit 32A instead of the air attitude/wind disturbance acceleration estimation unit 32 of the first embodiment. Unlike the first embodiment, the operation control device 30 of the second embodiment does not estimate an air attitude, but instead calculates an air attitude according to the result of measurement by the measurement device group 20, and then supplies the calculated data to the wind disturbance acceleration estimation unit 32A and the attitude control unit 34. The wind disturbance acceleration estimation unit 32A estimates a wind disturbance acceleration caused by wind based on the various physical quantities (e.g., position, velocity, acceleration, attitude, and angular velocity) measured by the measurement device group 20 in addition to the result of calculation of the air attitude, and then supplies the estimated wind disturbance acceleration to an adder. This feature is equal to the first embodiment. The second embodiment can also obtain an advantageous effect similar to that in the first embodiment.

The present invention is not limited to the aforementioned embodiments, and includes a variety of variations. For example, although the aforementioned embodiments have been described in detail to clearly illustrate the present invention, the present invention need not include all of the configurations described in the embodiments. It is possible to replace a part of a configuration of an embodiment with a configuration of another embodiment. In addition, it is also possible to add, to a configuration of an embodiment, a configuration of another embodiment. Further, it is also possible to, for a part of a configuration of each embodiment, add, remove, or substitute a configuration of another embodiment.

REFERENCE SIGNS LIST

1 Rocket
11 Body
12 Landing gear
13 Engine
14 Gimbal mechanism
15 Attitude control fin (aerodynamic control surface)
GC Center of gravity
20 Measurement device group
30 Operation control device
40 Gimbal actuator
50 Fin actuator

The invention claimed is:
1. A rocket control system for controlling a rocket, comprising:
 a gimbal actuator that controls a steering angle of a gimbal mechanism located on a lower side of a body of the rocket with respect to the center of gravity;
 a fin actuator that controls a steering angle of an attitude control fin located on an upper side of the body of the rocket with respect to the center of gravity;
 a detector that measures a physical quantity related to motion of the body of the rocket; and
 a controller that controls the gimbal mechanism and the attitude control fin according to a result of measurement by the detector to control horizontal translational motion of the rocket,
 wherein the controller is configured to:
 generate, according to a translational acceleration command for instructing a translational acceleration, a translational-acceleration-generation-pseudo-steering-angle command for instructing steering angles that should be applied to the gimbal mechanism and the attitude control fin in order to give the rocket a part or all of the translational acceleration without changing an attitude of the body of the rocket, and generate an attitude angle command for providing an instruction about an attitude angle that should be applied to the body of the rocket in order to give the rocket a remaining part of the translational acceleration by changing the attitude of the body of the rocket; and
 determine distribution of the translational acceleration command to the translational-acceleration-generation-pseudo-steering-angle command and to the attitude angle command according to the physical quantity measured by the detector.

2. The rocket control system according to claim 1, wherein the controller is configured to:
 generate, in order to generate an angular acceleration that should be given to the body of the rocket to reach the attitude angle instructed by the attitude angle command, an angular-acceleration-generation-pseudo-steering-angle command for instructing the steering angle that should be applied to the gimbal mechanism and/or the attitude control fin based on the attitude angle command; and
 further control the steering angle of the gimbal mechanism and the steering angle of the attitude control fin based on the translational-acceleration-generationpseudo-steering-angle command and the angular-acceleration-generation-pseudo-steering-angle command.

3. The rocket control system according to claim 2, wherein the controller is configured to calculate, based on the physical quantity measured by the detector, a wind disturbance acceleration that is an acceleration generated in the body due to wind around the rocket, and calculate the translational-acceleration-generation-pseudo-steering-angle command and the attitude angle command by taking the wind disturbance acceleration into account.

4. The rocket control system according to claim 3, wherein the controller is configured to calculate the wind disturbance acceleration based on the translational-acceleration-generation-pseudo-steering-angle command and the angular-acceleration-generation-pseudo-steering-angle command in addition to the physical quantity.

5. The rocket control system according to claim 1, wherein the controller is configured to calculate, based on the physical quantity measured by the detector, a wind disturbance acceleration that is an acceleration generated in the body due to wind around the rocket, and calculate the translational-acceleration-generation-pseudo-steering-angle command and the attitude angle command by taking the wind disturbance acceleration into account.

6. The rocket control system according to claim 1, wherein the translation-acceleration-generation-pseudo-steering-angle command corresponds to a translational acceleration generated by a direct force of the gimbal actuator and the fin actuator and the attitude angle command corresponds to a translational acceleration generated by an attitude change relative to a velocity vector of the rocket.

7. A method of controlling landing operation of a rocket, the rocket comprising: a gimbal mechanism located on a lower side of a body of the rocket with respect to the center of gravity, a steering angle of which can be changed; and an attitude control fin located on an upper side of the body of the rocket with respect to the center of gravity, a steering angle of which can be changed, the method comprising:
measuring a physical quantity related to motion of the body of the rocket;
controlling the gimbal mechanism and the attitude control fin according to a result of measurement of the physical quantity to control horizontal translational motion of the rocket;
generating, according to a translational acceleration command for instructing a translational acceleration, a translational-acceleration-generation-pseudo-steering-angle command for instructing steering angles that should be applied to the gimbal mechanism and the attitude control fin in order to give the rocket a part or all of the translational acceleration without changing an attitude of the body of the rocket, and generating an attitude angle command for providing an instruction about an attitude angle that should be applied to the body of the rocket in order to give the rocket a remaining part of the translational acceleration by changing the attitude of the body of the rocket; and
determining distribution of the translational acceleration command to the translational-acceleration-generation-pseudo-steering-angle command and to the attitude angle command according to the physical quantity.

8. The method according to claim 7, further comprising:
generating, in order to generate an angular acceleration that should be given to the body of the rocket to reach the attitude angle instructed by the attitude angle command, an angular-acceleration-generation-pseudo-steering-angle command for instructing the steering angle that should be applied to the gimbal mechanism and/or the attitude control fin based on the attitude angle command; and
controlling the steering angle of the gimbal mechanism and the steering angle of the attitude control fin based on the translational-acceleration-generation-pseudo-steering-angle command and the angular-acceleration-generation-pseudo-steering-angle command.

9. The method according to claim 8, further comprising:
calculating, based on the physical quantity, a wind disturbance acceleration that is an acceleration generated in the body due to wind around the rocket, and calculating the translational-acceleration-generation-pseudo-steering-angle command and the attitude angle command by taking the wind disturbance acceleration into account.

10. The method according to claim 9, wherein step of calculating calculates the wind disturbance acceleration based on the translational-acceleration-generation-pseudo-steering-angle command and the angular-acceleration-generation-pseudo-steering-angle command in addition to the physical quantity.

11. The method according to claim 7, further comprising:
calculating, based on the physical quantity, a wind disturbance acceleration that is an acceleration generated in the body due to wind around the rocket, and calculating the translational-acceleration-generation-pseudo-steering-angle command and the attitude angle command by taking the wind disturbance acceleration into account.

12. The method according to claim 7, wherein the translation-acceleration-generation-pseudo-steering-angle command corresponds to a translational acceleration generated by a direct force of the gimbal actuator and the fin actuator and the attitude angle command corresponds to a translational acceleration generated by an attitude change relative to a velocity vector of the rocket.

* * * * *